United States Patent [19]

Lacroix et al.

[11] Patent Number: 5,634,624
[45] Date of Patent: Jun. 3, 1997

[54] QUICK DISCONNECT COUPLER WITH SELECTIVELY INSERTABLE VALVE ASSEMBLY

[75] Inventors: Jean-Jacques Lacroix, Lovagny; Christophe Laporte, Doussard, both of France

[73] Assignee: Staubli Faverges, Faverges, France

[21] Appl. No.: 633,448

[22] Filed: May 17, 1996

[30] Foreign Application Priority Data

Apr. 26, 1995 [FR] France .................................. 95 05240

[51] Int. Cl.⁶ .................................................. F16L 37/28
[52] U.S. Cl. .................................. 251/149.6; 251/361
[58] Field of Search ........................... 251/149.6, 149.1, 251/149.7, 360, 361, 362, 363

[56] References Cited

U.S. PATENT DOCUMENTS 2,744,770  5/1956  Davidson et al. ................ 251/149.6 X
4,290,440  9/1981  Sturgis ............................ 251/149.6 X

FOREIGN PATENT DOCUMENTS 406286    9/1970  Australia .
1355712   2/1964  France .
826599    1/1960  United Kingdom ............... 251/149.6
1143013   2/1969  United Kingdom .

Primary Examiner—Kevin Lee
Attorney, Agent, or Firm—Dowell & Dowell

[57] ABSTRACT

A quick disconnect coupler for releasably coupling pipes which incorporates a valve assembly including a valve sleeve, a ring surrounding the sleeve, a spring for resiliently urging the ring relative to the sleeve and a valve seat carried by the ring, which valve assembly may be inserted within a principal member of a female element of the connector and be frictionally retained therein until being mechanically retained by a rear member selectively insertable within the principal member.

9 Claims, 3 Drawing Sheets

QUICK DISCONNECT COUPLER WITH SELECTIVELY INSERTABLE VALVE ASSEMBLY

BACKGROUND OF THE INVENTION

1. Field of the Invention

The present invention relates to a quick connection device used for the releasable coupling of pipes, which comprise two male and female elements fixed at the ends of the pipes to be connected and adapted to fit one in the other, and which device opens a valve provided inside the female element.

2. History of the Related Art

In known constructions, the body of the female element is generally constituted by an assembly of two tubular pieces, ordinarily screwed one in the other, ensuring at the same time assembly of the valve and of a closure spring which is associated therewith. The valve is directly mounted in the core of the body and cooperates with a seat formed by an O-ring suitably retained inside one of the afore-mentioned pieces.

It will be readily appreciated that such a structure does not lend itself well to automatic assembly employing robots or manipulators. Furthermore, the shape and dimensions of a rear piece of the body which is intended to be fastened to the end of a pipe, vary as a function of the type of coupling, and which obviously complicates storage of the connectors if it is desired to have a wide range of products available.

It is an object of the present invention to overcome these drawbacks.

SUMMARY OF THE INVENTION

The present invention therefore relates to a quick disconnect coupler or connector for releasable coupling pipes, of the type in which a tubular body of a female element, constituted by a tight assembly of a principal piece and a rear piece, contains a valve which is associated with an O-ring forming a seat and with a closure spring therein the valve is ground as a male element is fitted with the female element. The coupler is characterized by having an outer ring which surrounds the valve and by an O-ring which is carried by the front end of the ring. The spring, which is maintained between the valve and the ring, forms an independent assembly which, up to fastening of the rear piece of the body, is maintained axially in an axial bore of the principal piece, by friction of a deformable wall of the O-ring or seat against a smooth wall of the bore.

In other words, the valve, an outer ring which surrounds it, the closure spring which is maintained between the valve-bearing ring and the valve, and the O-ring or seat mounted on the valve-bearing ring, are in the form of an independent assembly adapted to be introduced, as a whole, inside the body of the female element and are retained therein, up to fastening of the rear tubular piece of the body, by friction of the deformable periphery of the O-ring or seat against the smooth wall of the bore of the body which contains the assembly. The fastening may be accomplished by a simple elastic clip.

BRIEF DESCRIPTION OF THE DRAWINGS

The invention will be more readily understood on reading the following description with reference to the accompanying drawings, in which.

DESCRIPTION OF THE PREFERRED EMBODIMENT

The present invention may be used with quick connectors of the type described in Applicants' French Patent Application No. 95/00612 filed on Jan. 16, 1995 for "Quick safety connection for removable coupling of pipes", to which reference may be made for structural details.

In this previous type of connection, the locking mechanism intended for axially immobilizing the male element comprises two concentric sets of clasps similar to those shown at 1 and 2 (FIG. 1) controlled by a sliding sleeve 3 associated with a return spring 4.

However, the present invention is applicable to all types of quick connectors which incorporate a resiliently loaded valve, whatever the arrangement of the mechanism used for locking the male element inside the female element.

Figure 1:
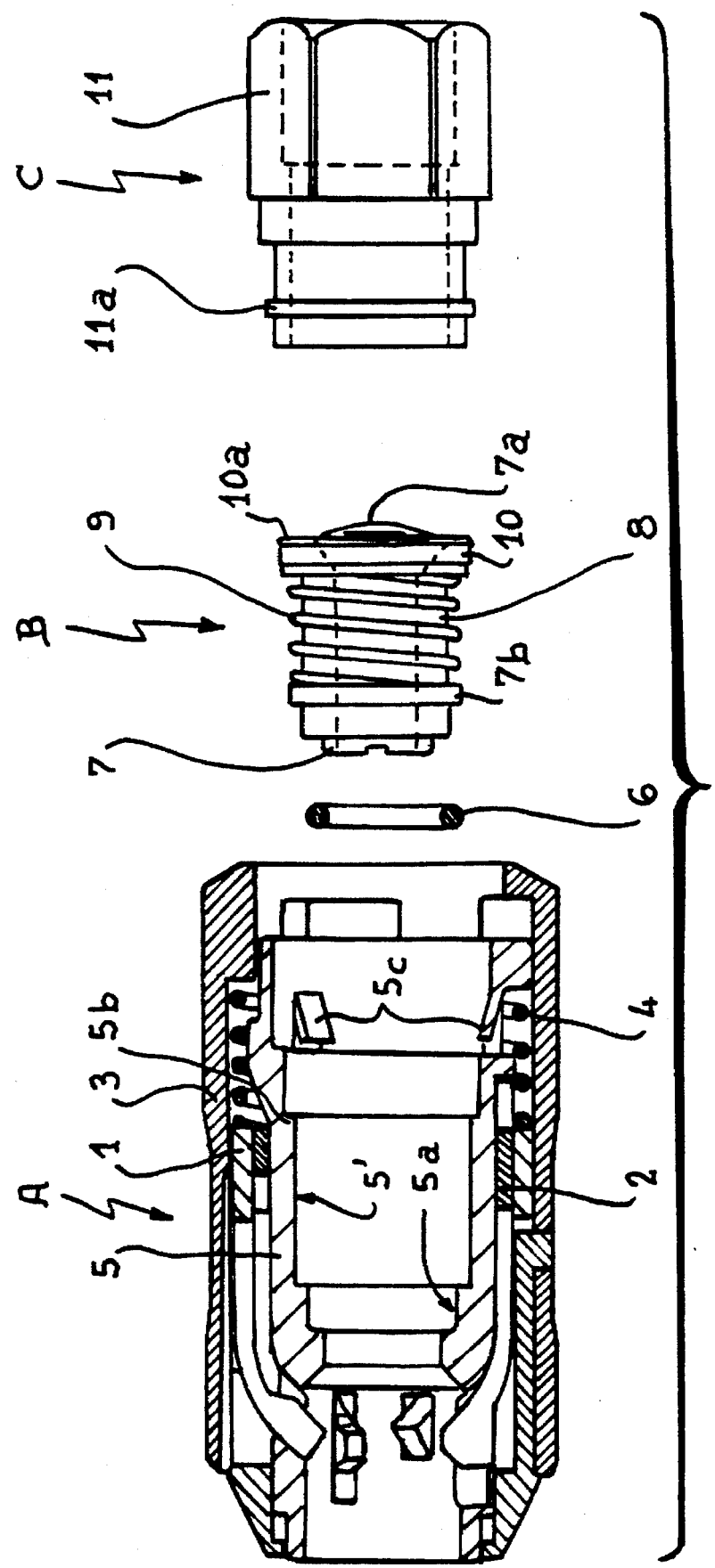
FIG. 1 is an assembly view showing the three principal parts which constitute the female element of a quick disconnect coupler according to the invention.

Referring to the drawings, the female element of the connection or coupling according to the invention is formed by three components referenced A, B and C, respectively, in FIG. 1.

Figure 2:
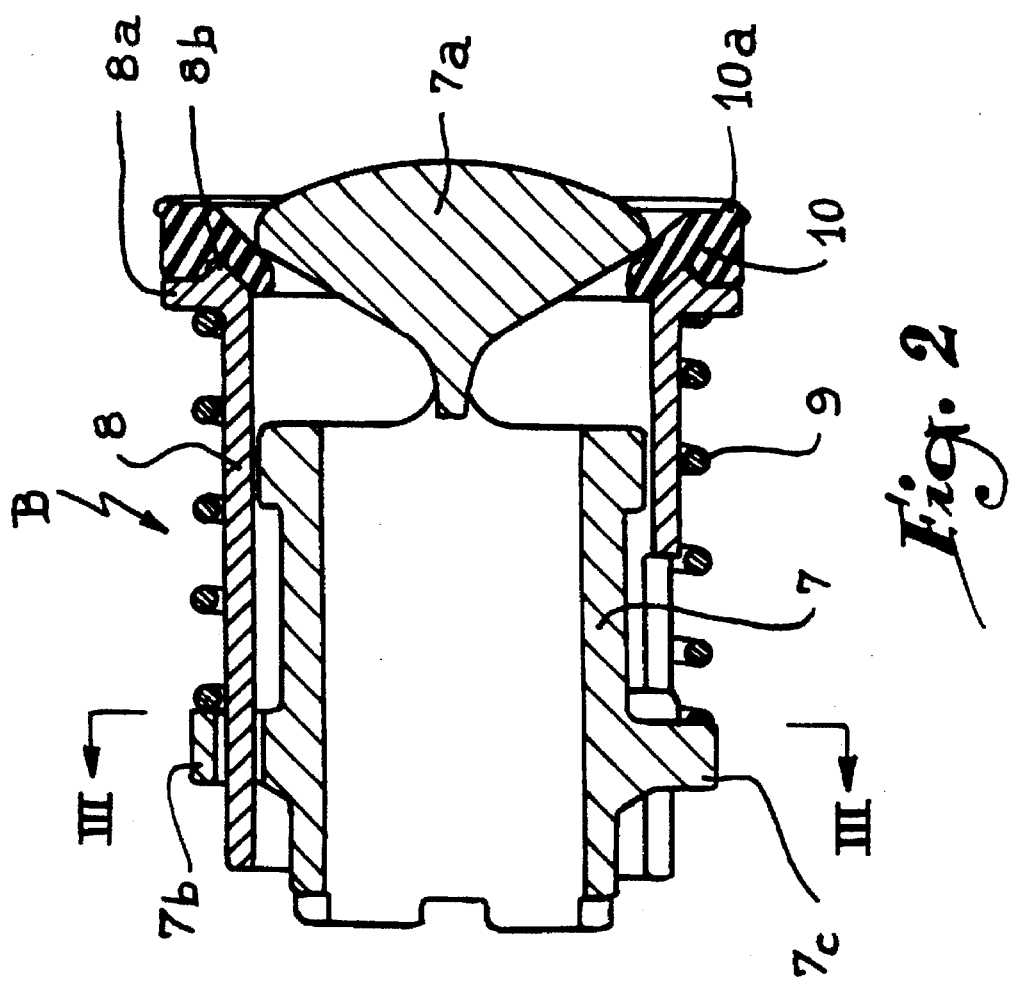
FIG. 2 is an axial cross-section, on a larger scale, of the valve assembly shown in FIG. 1.
Figure 3:
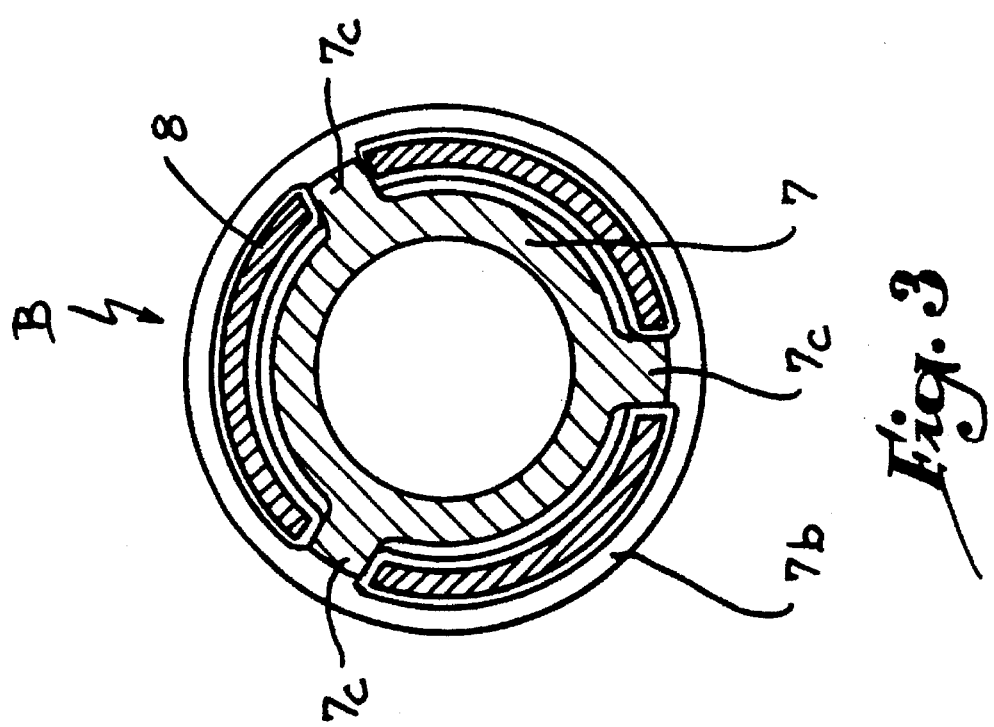
FIG. 3 is a transverse cross-section along line III—III of FIG. 2.

Assembly A essentially comprises a principal tubular member 5 which is equipped with the locking mechanism 1-2-3-4 mentioned hereinabove. This member 5, completed by an inner O-ring 6 housed in an annular cavity 5a in axial bore 5', receives an assembly B which has been shown in detail in FIGS. 2 and 3.

As shown, assembly B comprises a valve constituted by a sliding sleeve 7 which includes at one of its ends a suitably profiled obturated head 7a. Near its opposite end, the sleeve or valve 7 is provided with a ring 7b, which includes perforating along its longitudinal axis for assembly and guiding of an outer valve seat-bearing ring 8, split longitudinally to leave room for outwardly extending radial arms 7c defined by the perforations of the sleeve ring. A spring 9, engaged on the valve-bearing ring 8 between a shoulder or flange 8a thereof and the ring 7b of the sleeve 7, tends to push the latter and to apply its head 7a elastically against a seat carried by the ring 8. This seat is constituted by an O-ring 10 made of a natural or synthetic elastomer.

It will be observed that the seat or O-ring 10 is sectioned to comprise an annular cavity adapted to centre on a corresponding annular projection 8b provided on the terminal or end face of the ring 8, on the other hand a projecting lip 10a.

It will be appreciated that the bearing of head 7a against ring 8 limits axial displacement of valve 7 under the effect of spring 9, while the spring holds the ring in place. Under these conditions, assembly B behaves as a single independent assembly whose constituent parts cannot be released from one another in untimely fashion.

Figure 4:
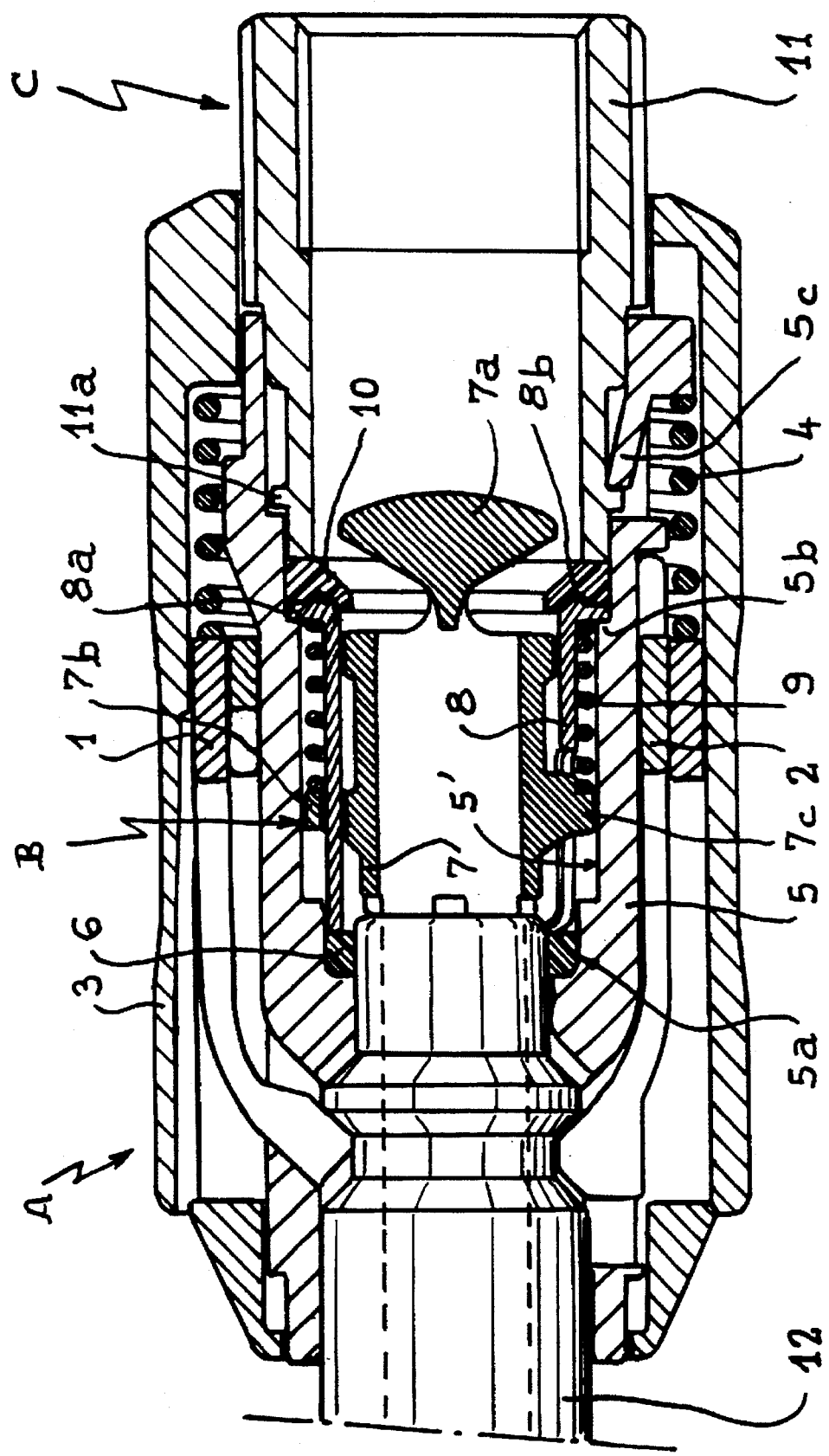
FIG. 4 is an axial cross-section of the assembled female element with the male element in the fitted position.

This independent assembly B may thus be introduced axially in the rear opening of bore 5' of the principal tubular member 5 of assembly A, in the manner illustrated in FIG. 4. The shoulder 8a abuts against an inner shoulder 5b of member 5, enclosing O-ring 6 which is thus maintained in cavity 5a. It is important to observe that, due to its projecting nature, the peripheral lip 10a of ring 10 is wedged in the axial bore of member 5, so that assembly B is retained in place by friction inside assembly A.

Assembly A, provided with assembly B, may thus be stored as it is in order to be equipped, when necessary, with assembly C. Assembly C includes a secondary or rear tubular piece 11 whose front part is intended to engage in the rear opening of the bore 5' of the principal member 5, while its rear part is sectioned to allow fixation thereof to the end of a pipe.

Member 11 may be conventionally fixed in member 5 by screwing and/or adhesion. However, according to a particularly advantageous characteristic of the invention, the inner wall of the axial bore 5' of member 5 has a series of longitudinal tongues 5c formed therein, oriented obliquely, inwardly and forwardly. Taking into account this oblique orientation, these tongues 5c are deformed when member 11 is axially engaged by force in bore 5' of member 5 and return elastically to clip behind an annular projection 11a provided on the periphery of member 11. Any dismantling of the latter is thus impossible, it being observed that no special tools are required for assembly which can therefore be effected very simply.

It will be noted that the seat or O-ring 10 simultaneously ensures tightness of the assembly of the two members 5 and 11 which form the body of the female element, by bearing and gripping between the shoulder 8a and the terminal edge of the member 11.

Functioning of valve 7–7a is otherwise identical to that of conventional valves, in that it is axially pushed into an open position when the male element 12 of the connection is fitted in the body 5–11 of the female element.

It will be appreciated that assembly B may be retained by friction, no longer by providing a projecting annular lip 10a, but by giving the periphery of the O-ring 10 an accentuated deformability adapted to ensure a frictional engagement against the wall of the bore 5'.

What is claimed is:

1. In a quick disconnect coupler for releasably coupling pipes which includes a tubular female element having a principal member defining a bore therein and a rear member, the principal member having a front end in which a male element is receivable and a rear end, and the rear member being slidably receivable within the rear end of the principal member, the improvement comprising, an independent valve assembly selectively slidably receivable within the bore intermediate the front and rear ends of the principal member, said valve assembly including a sleeve having first and second ends and an open passageway therethrough, a ring surrounding said sleeve and having a first end extending towards said first end of said sleeve and a second end having a generally annular valve seat mounted thereto, and a spring means mounted to said valve assembly so as to normally urge said second end of said sleeve toward said valve seat, and said valve seat being deformable so as to engage the inner walls defining the bore of the principal member to thereby retain said valve assembly in the bore until the rear member is received within said rear end of the principal member.

2. The quick disconnect coupler of claim 1 in which said valve assembly includes a valve head which extends from said second end of said sleeve, said valve head being configured so as to engage said valve seat to thereby block flow of a fluid through the open passageway through said sleeve when said head portion is engaged with said valve seat.

3. The quick disconnect coupler of claim 2 wherein said second end of said ring includes a terminal face having an annular projection extending therefrom, said valve seat including an annular recess therein in which said annular projection of said terminal face is received so as to center said valve seat with respect to said ring.

4. The quick disconnect coupler of claim 3 wherein said valve seat is formed of an elastomeric material.

5. The quick disconnect coupler of claim 3 wherein said sleeve includes radially extending portions, and said spring means extending between said radially extending portions of said sleeve and said outwardly extending flange of said ring.

6. The quick disconnect coupler of claim 5 wherein said sleeve includes an outer ring portion having arcuate openings therein, and portions of said ring extending through said openings in said outer ring portion of said sleeve.

7. The quick disconnect coupler of claim 6 wherein said valve seat is engageable by the rear member when said rear member is slidably received within the rear end of the principal member.

8. The quick disconnect coupler of claim 7 including means for elastically retaining the rear member within the principal member.

9. The quick disconnect coupler of claim 8 wherein said means for retaining includes elastic clips formed in the principal member and extending into the bore thereof, the rear member including outwardly extending portions engageable by said clips when the rear member is received within the rear portion of the principal member, whereby the rear member is restrained from being separated from the principal member.

\* \* \* \* \*